(12) United States Patent
Kerwin et al.

(10) Patent No.: US 7,544,947 B2
(45) Date of Patent: Jun. 9, 2009

(54) CROSS-TALK AND BACK SIDE SHIELDING IN A FRONT SIDE ILLUMINATED PHOTO DETECTOR DIODE ARRAY

(75) Inventors: David B. Kerwin, Colorado Springs, CO (US); Rockford Curby, Sunnyvale, CA (US)

(73) Assignee: Aeroflex Colorado Springs Inc., Colorado Springs, CO (US)

( * ) Notice: Subject to any disclaimer, the term of this patent is extended or adjusted under 35 U.S.C. 154(b) by 55 days.

(21) Appl. No.: 11/681,462

(22) Filed: Mar. 2, 2007

(65) Prior Publication Data

US 2007/0210259 A1    Sep. 13, 2007

Related U.S. Application Data

(60) Provisional application No. 60/780,313, filed on Mar. 8, 2006.

(51) Int. Cl.
    *G01T 1/24*   (2006.01)
(52) U.S. Cl. .................................. 250/370.11
(58) Field of Classification Search ............. 250/370.11
    See application file for complete search history.

(56) References Cited

U.S. PATENT DOCUMENTS

| | | | |
|---|---|---|---|
| 3,670,395 A * | 6/1972 | Abe et al. ................... | 228/145 |
| 4,414,473 A | 11/1983 | Hoffman et al. | |
| 4,417,144 A | 11/1983 | Hoffman et al. | |
| 4,429,227 A | 1/1984 | DiBianca et al. | |
| 4,982,096 A * | 1/1991 | Fujii et al. .................. | 250/367 |
| 5,773,829 A | 6/1998 | Iwanczyk et al. | |
| 5,866,908 A | 2/1999 | Novak | |
| 6,495,845 B1 * | 12/2002 | Tsunota et al. ............ | 250/505.1 |
| 6,510,195 B1 * | 1/2003 | Chappo et al. ................ | 378/19 |
| 6,667,183 B2 | 12/2003 | Levy | |
| 2005/0169430 A1 * | 8/2005 | Hoffman ..................... | 378/147 |

* cited by examiner

*Primary Examiner*—David P Porta
*Assistant Examiner*—Shun Lee
(74) *Attorney, Agent, or Firm*—Michael C. Martensen; William J. Kubida; Hogan & Hartson LLP

(57) ABSTRACT

A front side illuminated photo detector array is shielded from X-ray cross-talk by filling the septa between individual photo detector diodes with a high atomic number material such as tungsten. The processing circuitry is also shielded from stray X-rays by a barrier such as tungsten placed between each photo detector diode and the processing circuitry. This barrier serves a dual role as shielding the processing circuitry from stray X-ray radiation and acting as the electrical contact between the detector diode and the circuitry.

19 Claims, 4 Drawing Sheets

CROSS-TALK AND BACK SIDE SHIELDING IN A FRONT SIDE ILLUMINATED PHOTO DETECTOR DIODE ARRAY

RELATED APPLICATION

The present application claims the benefit of U.S. Provisional Application Ser. No. 60/780,313, filed Mar. 8, 2006. The disclosure of the foregoing United States Patent Application is specifically incorporated herein by this reference in its entirety.

BACKGROUND OF THE INVENTION

1. Field of the Invention

The present invention relates, in general, to X-ray shielding in a photo-detector diode array, and, more particularly, to methods and devices for shielding a front side illuminated photo-detector diode array from cross-talk and spurious back side illumination.

2. Relevant Background

The present application relates to the art of medical diagnostic imaging in which penetrating radiation is received by radiation sensitive detectors. The application subject matter finds particular use in computerized tomographic (CT) scanners and will be described with particular reference thereto. However, the invention may also find use in connection with other diagnostic imaging modalities, industrial quality assurance imaging, airport baggage inspection, X-ray fluoroscopy and the like.

Modern X-ray computer tomography scanners commonly employ several hundred X-ray detectors to convert X-ray energy into visible light and ultimately into electrical signals. A detector is usually composed of a scintillator to convert X-ray energy into light and a photodiode to convert that light into an electrical current. The formats of photodiodes used in CT applications can range from a single element, 1-D array to a multi-element, 2-D array.

Each active photodiode array comprises a series of scintillation crystals arranged on a substrate for converting X-ray radiation into light. Under each scintillator crystal is a back-illuminated photodiode that converts the light emitted from the scintillation crystals into an electrical charge. The electrical charge from the photodiodes is then conveyed via an electrical path to a signal processing circuit. Typically, the converted electrical charge leaves each photodiode via electrical connections through a plurality of paths in a substrate to the processing circuitry. The substrate serves both as a supporting mechanical foundation for the circuitry and the photodiode assembly, and as a shield to protect the processing circuitry from stray radiation.

FIG. 1 provides a plan and side view of a highly abstract rendition of a typical photodiode array 100 as is known in the art. A scintillator crystal 110 is typically a six sided cube wherein the one transparent face is bonded to a photodiode 140. The juncture between the scintillator crystal 110 and the photodiode 140 is normally a p+ on n− mating 135. The remaining sides of the crystal 110 are covered with an optically reflective material that facilitates channeling the light generated by the crystal to the transparent face and ultimately to the photodiode 140 below. The photodiode is thereafter connected to processing circuitry 160 via a bonding layer 150 or electrical paths amidst a substrate 158. Between each scintillator crystal arranged on the array 100 is a gap or septa 120. Interposed in the gap and typically extending some distance both above the plane of the scintillator crystals 110 and into the septa 120 are elements of an inter-scatter grid 170.

The inter-scatter grid 170, which is opaque to X-rays, serves to reduce X-ray cross-talk between adjacent scintillator crystals 110. Cross-talk occurs when an X-ray directed at a particular scintillator pixel possesses a trajectory so as to falsely impact an adjacent crystal. The result is noise, false imaging and/or ghosting. By placing an inter-scatter grid 170 in the septa 120 between the crystals, the likelihood of X-ray cross-talk is reduced. FIG. 2 shows an expanded depiction of the septa region 120 between two scintillator crystals 110 of FIG. 1. The inter-scatter grid 170 extends into the septa only a sufficient distance so as to prevent cross-talk between scintillator crystals 110. Inter-scatter grids 170 do not completely occupy the septa 120 between the crystals 110 and the underlying photodiodes 140. The remaining space provides a means by which stray X-rays can impact adjacent photodiodes or travel through the scintillator 110/photodiode 140 region and impact the processing circuitry 160 itself In the present state of the art of front side or back side photo detector diode arrays, electrical cross-talk can be minimized by using trench etching filled with oxide and poly-silicon to electrically isolate between diodes in the array. However, this material does not provide any isolation for X-rays traveling from one diode area to another, nor is this structure effective at stopping visible photons from penetrating to adjacent photodiodes. Also there has to be added shielding placed behind the photo detector array in order to protect the processing circuitry mounted behind the photodiode array that processes the signals from this detector.

The processing circuitry associated with each electrical signal from each active photodiode element is typically a Complementary Metal-Oxide Semiconductor ("CMOS") chip. CMOS is a major class of integrated circuits. CMOS chips include microprocessor, microcontroller, static RAM, and other digital logic circuits. A wire bond typically connects a top surface bond pad on one end of the photodiode to an external connection on the CMOS chip. The conductive path to the electronics is completed using various design options.

The wire bond density becomes acute for 2-D arrays. A conductive trace from each inner photodiode element in a 2-D array must be connected to the "outside world". This trace is usually included on the photodiode surface between rows of active photodiode elements. One trace is required per element and each trace usually terminates in a bond pad at an end of the 2-D array. Wire bonds from each trace are then made to external connections.

One problem of computer tomography relates to degradation of the signals as they travel over the long bus system between the radiation detectors and the signal processing circuitry.

CT scanners operate in a sea of extraneous radio frequency electromagnetic signals, the frequencies of which vary over a wide band. Sources of extraneous signals include X-rays passing through the septa, nearby operating electrical components, equipment, signals from other detectors, and the like. The extraneous analog signals are superimposed on and mix with the analog signals from the detectors. The superimposed extraneous signals appear as noise and fictitious data when reconstructed into images. The resulting images are degraded by noise, ghosting, and other artifacts.

Frequently stray X-rays find themselves traveling down the septa 120 rather than impacting a scintillator crystal 110. Some of these stray X-rays are blocked from the CMOS circuitry by a radiation shield imbedded in the supporting substrate. The substrate is typically a ceramic layer that provides both structural integrity for the array as well as a means for shielding the CMOS circuitry from stray radiation. In the absence of such shielding, the X-ray may penetrate completely through the photo detector die completely and continue on to any detector electronics mounted behind the detector chip producing spurious signals in those circuits. A shielding layer of a high atomic number such as tungsten is therefore typically imbedded in the substrate. Such a shield is expensive to implement. The number of interconnections between the photodiodes and the CMOS circuitry has also been long appreciated as a design limitation. One solution to this limitation is to bond the CMOS circuitry directly to the photodiodes via solder bumps. The result of this alternative means of attaching the CMOS circuitry has the significant advantage of eliminating the need for the expensive ceramic substrate. However, with this advantage comes an equally detrimental effect of exposing the CMOS circuitry to stray radiation.

The present invention contemplates an improved method and apparatus which overcomes the above, and other, referenced problems.

SUMMARY OF THE INVENTION

Briefly stated, the present invention involves methods and systems for shielding against stray X-rays in a photo detector diode array that can cause noise to be generated in electronic circuits mounted in close proximity on the back side of the detector. X-ray shielding is fabricated on both the front side for cross-talk shielding and on the back side to reduce stray X-rays from interfering with circuits mounted to the back side of the photo detector array.

The present invention provides an improved photo detector diode array with built-in cross-talk and back side radiation shielding. The built-in shielding of the present invention allows for the normal back side connection points to be routed via a bumped array of a flip chip interface circuits which can be mounted directly to the back side of the photo detector rather than having to go through a package or substrate that has additional imbedded shielding to protect the interface chip. Thus the ceramic substrate in the aforementioned example is eliminated by the present invention.

To accomplish the above structure, X-ray shielding must be placed between each photo detector diode in the array and, in another embodiment, on the back side of the array. Tungsten is know to be a material that strongly absorbs X-rays and can be deposited in a Chemical Vapor Deposition system, or other deposition methods such as sputtering, onto the surface of the back side of the photo detector array and into trenches etched between the diodes within the array.

Other materials or combination of materials that possess a high atomic number are also suitable for occupying the septa between each photo detector diode. The added shielding provided by the material placed in the septa along with the inherent shielding of the scintillator crystals provides an effective and comprehensive X-ray shield that protects the underlying processing circuitry.

The foregoing and other features, utilities and advantages of the invention will be apparent from the following more particular description of an embodiment of the invention as illustrated in the accompanying drawings.

BRIEF DESCRIPTION OF THE DRAWINGS

The aforementioned and other features and objects of the present invention and the manner of attaining them will become more apparent and the invention itself will be best understood by reference to the following description of a preferred embodiment taken in conjunction with the accompanying drawings, wherein.

The Figures depict embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION OF THE PREFERRED EMBODIMENTS

Methods and systems for X-ray cross-talk and back side shielding in a front side illuminated photo detector diode array. The present invention is illustrated and described in terms of aforementioned drawings. In order to adequately shield processing circuitry associated with a photo detector diode array so as to reduce or eliminate false signals, noise, ghosting, etc., the present invention fills the septa region between each photo detector diode of the array with a material that is opaque to X-ray radiation. In doing so, stray X-rays are prevented from impacting adjacent detector diodes and the processing circuitry underlying the photo detector diode array. This shielding allows the exclusion or elimination of a shielding layer normally placed in a substrate bonded to the photo detector diode array and used to wire bond the diodes to the processing circuitry.

The present invention is a significant improvement over the prior art. As discussed above, the current state of the art in photo detector diode design places a poly silicon material in the septa to electrically isolate the photo detector diodes of the array. Poly silicon is a poor shield against stray X-ray radiation. To prevent such stray radiation from reaching the processing circuitry, the prior art incorporates a shield imbedded in a substrate, typically ceramic, that additionally serves to wire bond each diode to the processing circuitry. This use of a passive ceramic substrate is inefficient and expensive.

Figure 1A:
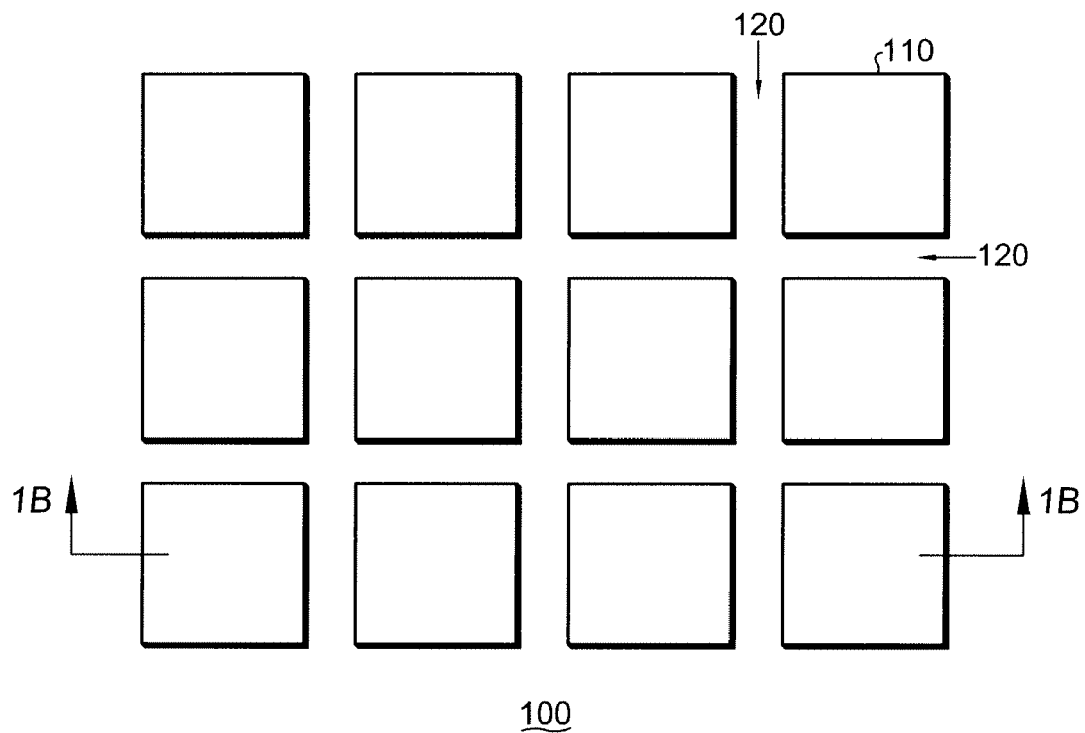
FIG. 1 provides a plan and side view of a highly abstract rendition of a typical photodiode array as is known in the art.
Figure 1B:
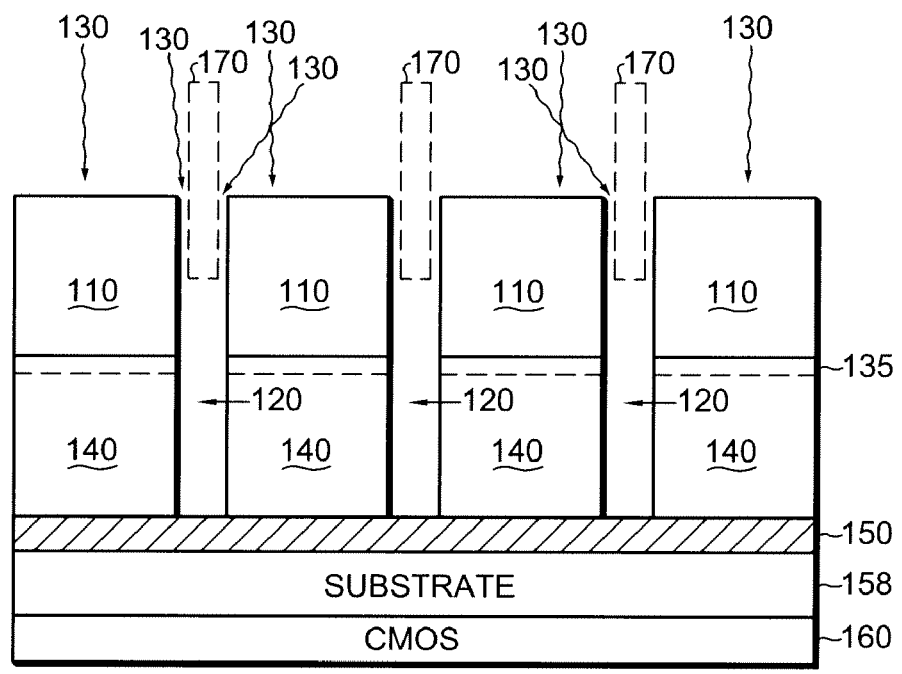
Figure 2:
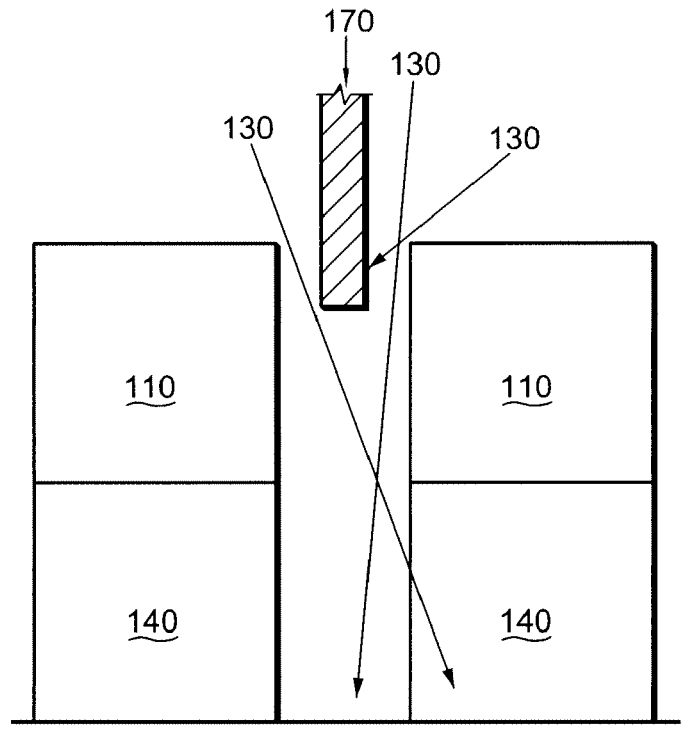
FIG. 2 shows an expanded depiction of the septa region of the photodiode array of FIG. 1 as is known in the art.
Figure 3:
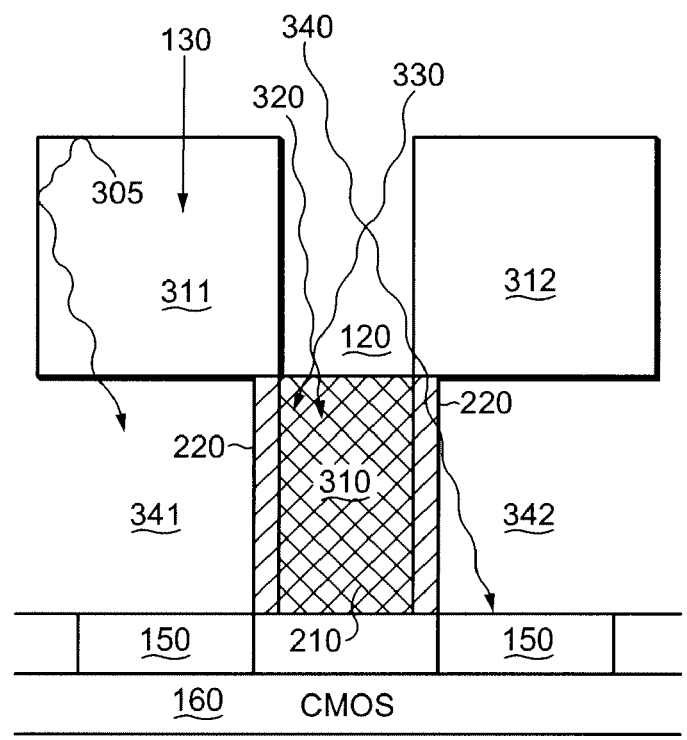
FIG. 3 shows one embodiment for cross-talk and back side shielding in a front side illuminated photo detector diode array according to the present invention.

The present invention allows for the exclusion of this wire bonding/shielding substrate. FIG. 3 shows a cross sectional view of two scintillator crystals and photo detector diodes bonded to a bumped array, flip chip interface with a CMOS circuit according to one embodiment of the present invention. The scintillator crystals 311, 312 are bonded to the photo detector diodes 341, 342 as is known in the art. As X-ray radiation 130 impacts the scintillator crystal 311, it is converted to a visible light photon 305. The sides of the scintillator crystal 311 are such that the photon 305 can only exit the scintillator crystal 311 on the face bonded with the photo detector diode 341. The photo detector diode thereafter converts the photon to an electrical signal which is conveyed via the bump connection 150 to the CMOS circuitry 160.

In one embodiment of the present invention, the septa 120 located between each photo detector diode is filled with an X-ray opaque material 310. Materials with high atomic numbers are known to be opaque to X-rays. Materials such as tungsten, gold, platinum are known in the art to possess these qualities and would be excellent choices for implementation of the present invention. As one skilled in the relevant art will appreciate, the actual material used in manufacturing a diode array consistent with the present invention may vary without impacting the scope of the present invention.

The material filling the septa 120 will, in one embodiment of the present invention and as shown in FIG. 3, occupy the entire septa 120 region associated with each photo detector diode 341, 342. Along side the material 310 occupying the septa 120 are two passivation layers 220 that serve to electrically isolate each photo detector diode 341, 342. The actual thickness of the material 310 placed in the septa will vary depending on its atomic number and the expected energy of the stray X-rays.

So as to better understand the significance of each element of the present invention, FIG. 3 shows three stray X-rays that may causes noise, distortion, ghosting, etc. in the image processed by the processing circuitry 160. As was previously discussed, a typical X-ray 130 impacting the scintillator crystal 311 does not impact either the photo detector diode 341 or the CMOS circuitry 160. The scintillator crystals 311, 312 possess inherent X-ray shielding qualities. Protecting the processing circuitry against stray X-rays, 320, 330 340 that do not impact the scintillator crystal 311, 312 is one object of this invention. X-ray 320 represents a stray X-ray that missed the scintillator crystal 311 and, but for the material 310 occupying the septa 120, would affect the underlying CMOS circuitry 160. Likewise, X-ray 330 represents a stray X-ray that, due to its trajectory, would impact the adjacent photo detector diode 341 rather than the photo detector diode 342 for which it was originally intended. The material 310 occupying the septa 120 prevents this type of X-ray cross-talk or impact into the CMOS circuitry. Finally, stray X-ray 340 possesses a trajectory that like X-ray 330 is an instance of X-ray cross-talk. The trajectory of X-ray 340 is unique in that it misses the material 310 occupying the septa 120 and may impact the CMOS circuitry 160 via the photodiode. Unlike a normal X-ray 130 that impacts the scintillator crystal 311, 312 the photo detector diode 341, 342 does not act as a sufficient shield to the passing of a stray X-ray. To prevent this type of stray X-ray 340 to reach the CMOS circuitry 160, the bump connection of each photo detector diode 150 possesses, in one embodiment of the invention, material of a high atomic number that can shield the CMOS circuitry 160 from stray X-rays 340 as well as be electrical conductive for the conveyance of the electrical signal generated by the photo detector diode. In one embodiment, the bump connection comprises an aluminum and tungsten combination. Other materials and material combinations are contemplated by the present invention without exiting the scope of the invention.

Figure 4:
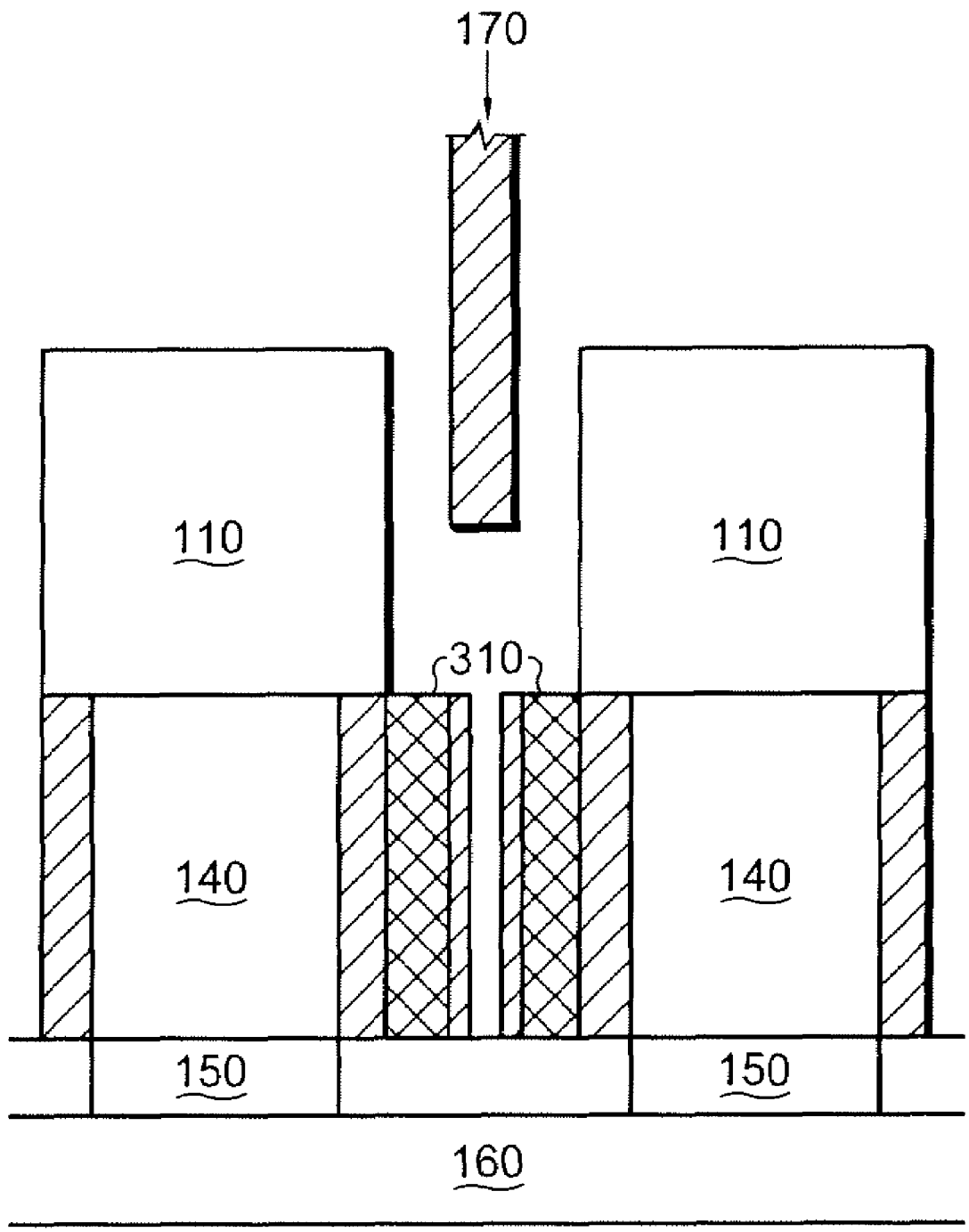
FIG. 4 shows another embodiment for cross-talk and back side shielding in a front side illuminated photo detector diode array having inter-scatter grids according to the present invention.

FIG. 4 shows another embodiment for cross-talk and back side shielding in a front side illuminated photo detector diode array having inter-scatter grids according to the present invention. The inter-scatter grid 170 is, by design, opaque to X-ray radiation. The inclusion of the inter-scatter grid 170 enables less space of the septa 120 to be filled with an opaque material 310 without comprising the outcome of having the entire septa 120 filled. In this embodiment, material that is opaque 310 to X-ray radiation occupies the area in the septa 120 between the photo detector diodes 140 that is not overshadowed by the inter-scatter grid 170. This embodiment provides the same shielding capability of the previous embodiment yet minimizes the amount of material that must be deposed into the trench.

In situations where the septa 120 trench does not transpose the entire thickness of the photo detector diode array, material can be deposed into the trench from either or both sides so as to achieve the same results. Until recently it has been impractical to create a trench that transposes the entire thickness of the array due to the possibility of comprising the structural integrity of the wafer. The present invention is equally applicable to either trench configuration.

Figure 5:
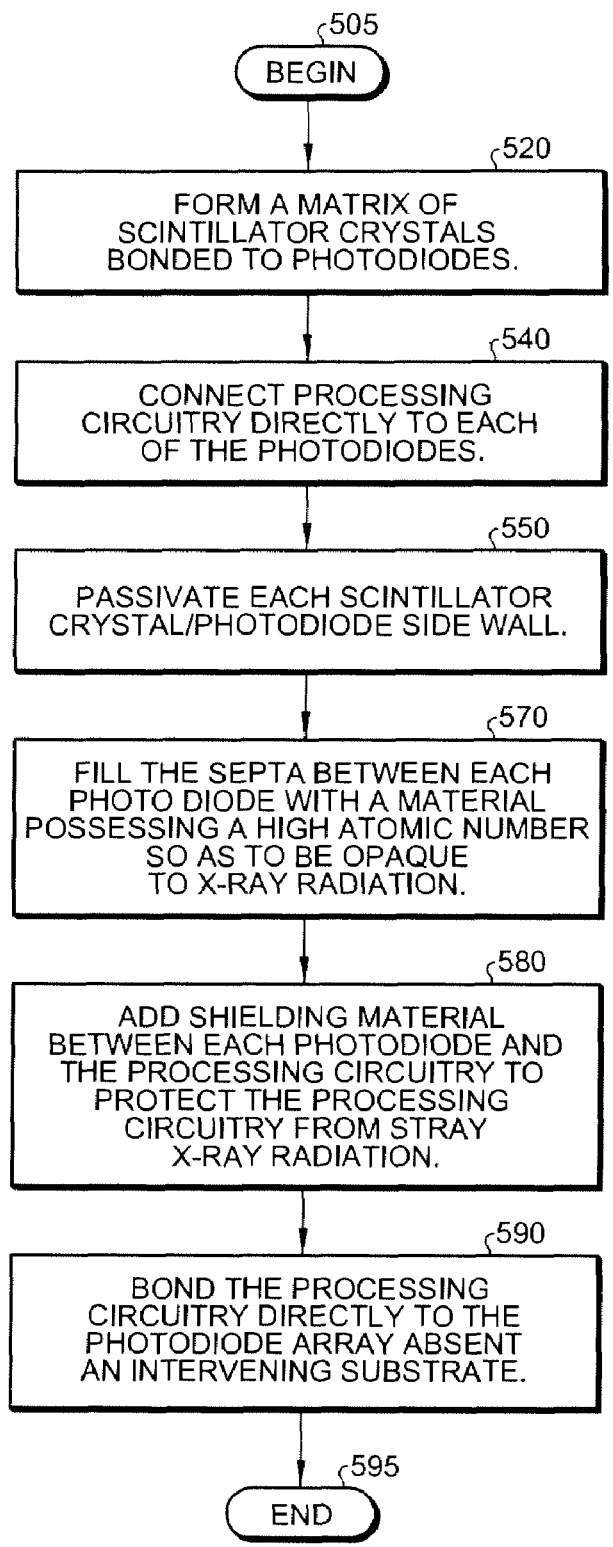
FIG. 5 is a high level flow chart for a method of shielding a front-sided illuminated photo detector diode array by filling the septa with a X-ray opaque material.

FIG. 5 is a high level flow chart for a method of shielding a front-sided illuminated photo detector diode array by filling the septa with an X-ray opaque material according to one embodiment of the present invention. The process begins 505 with a bonded silicon to silicon wafer. According to one embodiment of the present invention, a handle wafer of a p+ or n+ type with a resistivity of approximately 0.001-0.02 ohm/cm and a thickness of approximately 380-550 microns less the device wafer thickness is used. The device wafer to which the handle wafer is bonded is of the p– or n– type with a corresponding resistivity of approximately 800-5000 ohm/cm and an approximate thickness of 20-200 microns.

A thermal oxide or a chemical vapor deposition oxide is grown or deposited onto both sides of the wafer. Thereafter, a photo-resist pattern of approximately 35 microns is processed on either the front side or the back side of the wafer 520. A hole etched through the array is created using a high density plasma RIE to minimize the under cut and taper of the hole. This hole serves to connect the front side n+ or p+ implant region to the back side of the chip.

The wafer is oxidized to insulate the hole from a conductor deposited later in the process. Poly-silicon is then deposited onto the wafer and into the hole. The poly-silicon can be insitu doped or can be grown, or doped and grown so as to have a low resistivity. The poly-silicon provides an electrical connection 540 between front side of the device to the back side of the handle wafer that is electrically isolated from the handle and device wafer.

A trench pattern is etched into the front side of the wafer surrounding each of the photo detector diodes. The trenches are typically etched through the device wafer into the handle wafer. Each trench is thereafter filled with an oxide and, in one embodiment, tungsten to act as an X-ray shield between each photo detector diode. In an alternative embodiment, the structure of the wafer could be accomplished on the back side of the wafer making the trenches on that side so as to maximize the shielding on the back side.

Thereafter the trench area is implanted and annealed 550 with a species of the same type as the handle and device wafers. This step prevents inversion in the surface of the device wafer. The back side and the trenches are also oxidized.

The front side of the wafer is photo-masked to remove oxide for ion implantation of the anode or cathode. The implant and anneal process is typically at a high temperature in order to maintain a thin (<0.5 micron) high dope region on the front side of the wafer. The final passivation of oxide or oxide/nitride is then accomplished.

The back side of the wafer is then masked to be open to the field region down to the handle wafer leaving an oxide region to protect the poly-silicon feed through region. Tungsten is then deposited on both sides of the device. The front side needs to have a thickness of tungsten that will close up the trench 570 between the photo detector diodes to the degree necessary for shielding. Tungsten deposited on the back side of the wafer 580 should be of a thickness that can be processed without causing problems of peeling, cracking or excessive stress on the wafer.

The back side of the wafer is photo-masked and tungsten is removed from areas of poly-silicon feed through. A chemical vapor deposition oxide is deposited over the back side of the wafer for passivation and to run a metallization pattern from the poly-silicon feed through to the bump connection pattern 590 of the interface chip or chips. The process ends at 595.

Photo-masking opens up contacts to the poly-silicon feed through points and to the tungsten ground plane. The back side is metalized with an interconnect metal and then photo-masked and etched 580.

The deposition of tungsten or another high atomic material into the trenches has several advantages over the prior art. Beyond serving as a shield to X-ray radiation, high atomic numbered material such as tungsten is also optically opaque. Poly-silicon, used in the prior art, is not optically opaque and thus provides a means for optical cross-talk between photo detector diodes. The optically opaque nature of tungsten and other material of sufficient atomic number to shield the device from stray X-rays prevents optical cross-talk between photo detector diodes as well as X-ray cross-talk.

High atomic number materials consistent with those disclosed herein also are thermally conductive. Photo detector diodes and scintillator crystals generate, as a byproduct of the conversion of the X-ray radiation to light and the light to an electrical charge, heat. It is desirable to maintain a thermal consistency throughout the photo detector diode array. Material such as tungsten occupying the septa (trenches) can serve as a thermal conduit. To maintain consistent thermal conditions throughout the wafer heat can be channeled through the tungsten to various ports allowing the wafer to maintain a thermally ideal state.

Although the invention has been described and illustrated with a certain degree of particularity, it is understood that the present disclosure has been made only by way of example, and that numerous changes in the combination and arrangement of parts can be resorted to by those skilled in the art without departing from the spirit and scope of the invention, as hereinafter claimed.

As will be understood by those familiar with the art, the invention may be embodied in other specific forms without departing from the spirit or essential characteristics thereof. Likewise, the particular naming and division of the modules, managers, functions, systems, engines, layers, features, attributes, methodologies and other aspects are not mandatory or significant, and the mechanisms that implement the invention or its features may have different names, divisions and/or formats. Although claims have been formulated in this application to particular combinations of features, it should be understood that the scope of the disclosure herein also includes any novel feature or any novel combination of features disclosed either explicitly or implicitly or any generalization or modification thereof which would be apparent to persons skilled in the relevant art, whether or not such relates to the same invention as presently claimed in any claim and whether or not it mitigates any or all of the same technical problems as confronted by the present invention. The Applicant hereby reserves the right to formulate new claims to such features and/or combinations of such features during the prosecution of the present application or of any further application derived therefrom.

We claim:

1. A method for cross-talk and back side shielding in a front side illuminated photo detector diode array, the method comprising the steps of:
    forming a matrix of scintillator crystals wherein each scintillator crystal is bonded to a photodiode wherein the matrix creates a septa between each scintillator crystal photodiode element and wherein each scintillator crystal photodiode element possesses a sidewall associated with each septa;
    connecting a processing circuitry to each photodiode directly via a pattern of electrical contacts;
    passivating each scintillator crystal photodiode element sidewall with an oxide; and
    filling the septa with a material possessing an atomic number sufficient to shield the processing circuitry from X-ray radiation, wherein the width of the material is less than the width of the septa thereby leaving an air gap between opposing sides of the material.

2. The method of claim 1, wherein the material filling the septa is tungsten.

3. The method of claim 1, wherein the material filling the septa is gold.

4. The method of claim 1, further comprising applying a shield of a high atomic number material between each photodiode and the processing circuitry.

5. The method of claim 1, wherein the material filling the septa reduces optical cross-talk between photodiodes.

6. The method of claim 1, wherein filling further comprises determining a depth of the material so as to match or exceed the shielding capability of the scintillator crystal photodiode element.

7. The method of claim 1, wherein filling the septa with the material is sufficient to block off axis X-ray radiation from impacting the sidewall of each adjacent scintillator crystal photodiode element.

8. The method of claim 1, further comprising placing an inter-scatter grid within each septa wherein the inter-scatter grid extends to a point in the septa short of the photodiode and wherein the inter-scatter grid is of a width that is less than a width associated for the septa leaving a gap on each side of the inter-scatter grid between the inter-scatter grid and each scintillator crystal photodiode element sidewall.

9. The method of claim 8, wherein filling the septa comprises filling the gap on either side of the inter-scatter grid with the material.

10. The method of claim 1, wherein the material occupying the septa acts as a heat conduit for the array.

11. A cross-talk and back side shielded photo detector diode array system, comprising:
    a matrix of scintillator crystals wherein each scintillator crystal is bonded to a photo detector diode;
    a septa region between each scintillator crystal photodiode element wherein each scintillator crystal photodiode element possesses a sidewall associated with each septa region;
    a processing circuitry electrically connected to each photodiode directly via a pattern of electrical contacts;
    an oxide layer applied to each scintillator crystal photodiode element sidewall; and
    a material occupying the septa region wherein the material possesses an atomic number sufficient to shield the processing circuitry from X-ray radiation, wherein the width of the material is less than the width of the septa thereby leaving an air gap between opposing sides of the material.

12. The photo detector diode array of claim 11, wherein the material occupying the septa is tungsten.

13. The photo detector diode array of claim 11, wherein the material occupying the septa is gold.

14. The photo detector diode array of claim 11, further comprising a shield of a high atomic number material between each photodiode and the processing circuitry.

15. The photo detector diode array of claim 11, wherein the material occupying the septa reduces optical cross-talk between photodiodes.

16. The photo detector diode array of claim 11, wherein the material occupying the septa is sufficient to block off axis X-ray radiation from impacting the sidewall of each adjacent scintillator crystal photodiode element.

17. The photo detector diode array of claim 11, further comprising an inter-scatter grid placed within each septa wherein the inter-scatter grid extends to a point in the septa short of the photodiode and wherein the inter-scatter grid is of a width that is less than a width associated for the septa leaving a gap on each side of the inter-scatter grid between the inter-scatter grid and each scintillator crystal photodiode element sidewall.

18. The photo detector diode array of claim 17, wherein the gap on either side of the inter-scatter grid is occupied by the material.

19. The photo detector diode array of claim 11, wherein the material occupying the septa acts as a heat conduit for the array.

* * * * *